United States Patent
Jung et al.

(10) Patent No.: US 10,892,448 B2
(45) Date of Patent: Jan. 12, 2021

(54) POUCH EXTERIOR FOR SECONDARY BATTERY, POUCH-TYPE SECONDARY BATTERY USING THE POUCH EXTERIOR, AND METHOD OF MANUFACTURING THE POUCH-TYPE SECONDARY BATTERY

(71) Applicant: LG Chem, Ltd., Seoul (KR)

(72) Inventors: Tai-Jin Jung, Daejeon (KR); Jeong-O Mun, Daejeon (KR); Byoung-Cheon Jeong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 169 days.

(21) Appl. No.: 16/067,472

(22) PCT Filed: Aug. 29, 2017

(86) PCT No.: PCT/KR2017/009440
§ 371 (c)(1),
(2) Date: Jun. 29, 2018

(87) PCT Pub. No.: WO2018/048133
PCT Pub. Date: Mar. 15, 2018

(65) Prior Publication Data
US 2019/0027714 A1 Jan. 24, 2019

(30) Foreign Application Priority Data
Sep. 12, 2016 (KR) .................. 10-2016-0117301
Aug. 23, 2017 (KR) .................. 10-2017-0106833

(51) Int. Cl.
*H01M 2/02* (2006.01)
*H01M 10/04* (2006.01)
(Continued)

(52) U.S. Cl.
CPC ......... *H01M 2/0287* (2013.01); *H01M 2/021* (2013.01); *H01M 2/0212* (2013.01);
(Continued)

(58) Field of Classification Search
CPC .. H01M 2/0287; H01M 2/021; H01M 2/0212; H01M 2/0275; H01M 10/0463;
(Continued)

(56) References Cited

U.S. PATENT DOCUMENTS

2006/0216591 A1* 9/2006 Lee ...................... H01M 2/021
429/175
2009/0311592 A1 12/2009 You et al.
(Continued)

FOREIGN PATENT DOCUMENTS

JP 2004-071301 A 3/2004
KR 10-2000-0013159 A 3/2000
(Continued)

OTHER PUBLICATIONS

International Search Report and Written Opinion for Application No. PCT/KR2017/009440, dated Dec. 6, 2017 (10 Pages).

*Primary Examiner* — Gary D Harris
(74) *Attorney, Agent, or Firm* — Morgan, Lewis & Bockius LLP

(57) ABSTRACT

Disclosed are a pouch exterior capable of easily mounting an electrode assembly at an accurate position between accommodating parts, having an integrated form to minimize sealing parts contacting the air and to increase a lifetime of a battery, capable of preventing a rupture of the pouch exterior in an assembly process, and capable of increasing an energy density of a cell, a pouch-type secondary battery using the pouch exterior, and a method of manufacturing the pouch-type secondary battery. A pouch exterior for a secondary battery, according to the present disclosure, includes two corresponding accommodating parts configured to mount an electrode assembly therebetween and symmetrically formed at both sides by disposing a protruding part therebetween, and is folded along two folding lines outside a center part of the protruding part by vertically mounting a (Continued)

side surface of the electrode assembly on the protruding part, such that folded parts surround side edges of the electrode assembly.

14 Claims, 16 Drawing Sheets

(51) Int. Cl.
  *H01M 10/647* (2014.01)
  *H01M 2/08* (2006.01)
(52) U.S. Cl.
  CPC ........... *H01M 2/0275* (2013.01); *H01M 2/08* (2013.01); *H01M 10/0436* (2013.01); *H01M 10/0463* (2013.01); *H01M 10/647* (2015.04)
(58) Field of Classification Search
  CPC ... H01M 10/0436; H01M 2/08; H01M 10/647

USPC ........................................................ 429/163
See application file for complete search history.

(56) References Cited

U.S. PATENT DOCUMENTS

| | | |
|---|---|---|
| 2013/0101894 A1 | 4/2013 | Baba et al. |
| 2016/0043355 A1 | 2/2016 | Byun et al. |
| 2016/0380245 A1 | 12/2016 | Kang |

FOREIGN PATENT DOCUMENTS

| | | |
|---|---|---|
| KR | 10-0895202 B1 | 5/2009 |
| KR | 10-1253671 B1 | 4/2013 |
| KR | 10-2015-0061990 A | 6/2015 |
| WO | 2019/017637 A1 | 1/2019 |

* cited by examiner

POUCH EXTERIOR FOR SECONDARY BATTERY, POUCH-TYPE SECONDARY BATTERY USING THE POUCH EXTERIOR, AND METHOD OF MANUFACTURING THE POUCH-TYPE SECONDARY BATTERY

TECHNICAL FIELD

The present disclosure relates to a pouch exterior for a secondary battery, a pouch-type secondary battery using the pouch exterior, and a method of manufacturing the pouch-type secondary battery, and more particularly, to a pouch exterior for a secondary battery, the pouch exterior being formed in an improved shape to increase an energy density of a cell, a pouch-type secondary battery using the pouch exterior, and a method of manufacturing the pouch-type secondary battery. The present application claims priority under 35 U.S.C. § 119 to Korean Patent Application No. 10-2016-0117301 filed on Sep. 12, 2016, and Korean Patent Application No. 10-2017-0106833 filed on Aug. 23, 2017, in the Republic of Korea, and under 35 U.S.C. § 365 to PCT/KR2017/009440 filed on Aug. 29, 2017, the disclosures of which are incorporated herein by reference.

BACKGROUND

Secondary batteries are broadly used as power sources of mobile devices such as cellular phones, laptop computers, and camcorders. Particularly, use of lithium secondary batteries is rapidly increased due to advantages thereof, e.g., a high operating voltage and a high energy density per unit weight.

The lithium secondary batteries mostly use lithium-based oxide as a positive electrode active material and use a carbon material as a negative electrode active material. In general, the lithium secondary batteries are divided into lithium ion batteries, lithium ion polymer batteries, and lithium polymer batteries depending on electrolyte types, or are divided into cylindrical, prismatic, and pouch-type secondary batteries depending on battery shapes. Typically, in terms of battery shapes, the prismatic and pouch-type secondary batteries having small thicknesses and thus usable in products such as cellular phones are highly demanded.

Particularly, much attention is focused on the pouch-type secondary batteries, which have no restriction in shape and size, are easily assemblable through thermal fusion, are capable of easily discharging a gas or a liquid in an abnormal state, and thus are properly useable to produce light and thin cells. In general, a pouch-type secondary battery has a structure in which an electrode assembly is embedded in a pouch exterior configured as an aluminum laminate sheet. That is, the pouch-type secondary battery is manufactured by forming an accommodating part for mounting an electrode assembly therein, in an aluminum laminate sheet, mounting the electrode assembly in the accommodating part, and thermally fusing an additional aluminum laminate sheet separate from or extending from the aluminum laminate sheet.

The accommodating part may be formed in the pouch exterior by compressing the aluminum laminate sheet having a thickness of about 113 μm using a die and a punch based on a method similar to a deep drawing process. However, since the above-described thin aluminum laminate sheet may be, for example, ruptured while being compressed, in general, an accommodating part having a depth equal to or greater than 15 mm may not be easily formed.

In a separate-type pouch exterior, since two units of aluminum laminate sheets are overlapped and sealed together, two accommodating parts having mounted an electrode assembly therebetween should be overlapped with each other to an accurate position to manufacture a secondary battery. If the electrode assembly is not mounted at the accurate position, since an internal short circuit is caused, a guide device is additionally required and thus manufacturing costs are increased. In addition, since the two units of the aluminum laminate sheets are combined at four sides to generate sealed parts, all of the four sides may contact the air, air may easily permeate thereinto when used for a long time, and thus a lifetime of the battery may be reduced.

To solve the above problems, a variety of technologies related to a method of forming two corresponding accommodating parts in a single unit of an aluminum laminate sheet, overlapping the accommodating parts with each other, and sealing three sides thereof are disclosed.

FIG. 1 is a top view of a pouch exterior 10 of a conventional three-side sealed pouch-type secondary battery. FIG. 2 illustrates sequential cross-sectional views for describing a method of manufacturing a pouch-type secondary battery 40 using the pouch exterior 10 of FIG. 1, taken along a line II-If of FIG. 1. FIG. 3 is a top view of the pouch-type secondary battery 40 manufactured using the method of FIG. 2.

Initially, referring to FIGS. 1 and 2(a), two accommodating parts 20a and 20b having perfectly corresponding shapes and sizes are formed in a single unit of the pouch exterior 10 to be spaced apart from each other by a predetermined distance d greater than a thickness of an electrode assembly 30.

Then, the electrode assembly 30 is mounted in the accommodating part 20a or 20b at a side as shown in FIG. 2(b), a center part F between the accommodating parts 20a and 20b is folded as shown in FIG. 2(c) to overlap the accommodating parts 20a and 20b as shown in FIG. 2(d), and three sides other than the folded side are sealed (S), thereby manufacturing the pouch-type secondary battery 40 illustrated in FIG. 3.

According to the above-described technology of manufacturing the pouch-type secondary battery 40, a depth t of the accommodating parts 20a and 20b formed in the pouch exterior 10 may be reduced to about a half of a cell thickness, and one of four sides of the pouch-type secondary battery 40 (near the folded center part F) may be maintained in a sealed state.

However, when the pouch exterior 10 is compressed to form the two adjacent accommodating parts 20a and 20b, since the center part F to be folded elongates in two directions to generate the accommodating parts 20a and 20b, compared to a case in which the center part F elongates only in a single direction, mechanical strength of the center part F is unavoidably reduced and thus the center part F may be easily ruptured when the accommodating parts 20a and 20b are formed and/or when the center part F is folded. Therefore, the accommodating parts 20a and 20b are formed to be spaced apart from each other by the predetermined distance d, and a margin of about 1.5 mm to 3 mm is given near the center part F to be folded to fold the pouch exterior 10, in consideration of a bent shape of the folded part of the pouch exterior 10.

A high capacity and a small size of a pouch-type secondary battery are required by many clients and various structures and processes are being researched/developed to satisfy the requirements of the clients. Particularly, many researches are focused on a method of increasing the capacity of a pouch-type secondary battery using an unnecessary space.

However, in the conventional three-side sealed pouch-type secondary battery 40 described above in relation to FIGS. 1 to 3, a folded part w corresponding to an unnecessary space is generated and protrudes outward due to the margin of about 1.5 mm to 3 mm, which is given near the center part F to be folded to fold the pouch exterior 10. The folded part w serves as a restriction on a cell capacity, reduces an energy density in a module/pack, is disadvantageous for a cooling structure, and thus should be improved.

As described above, a single unit of a pouch exterior capable of minimizing a defect rate by preventing a rupture of the pouch exterior when electrode assembly accommodating parts are formed and/or when the pouch exterior is folded to overlap the accommodating parts, and not having an unnecessary space to increase an energy density of a cell is highly required.

SUMMARY

The present disclosure is designed to solve the problems of the related art, and therefore the present disclosure is directed to providing a pouch exterior capable of easily mounting an electrode assembly at an accurate position between accommodating parts, having an integrated form to minimize sealing parts contacting the air and to increase a lifetime of a battery, capable of preventing a rupture of the pouch exterior in an assembly process, and capable of increasing an energy density of a cell.

The present disclosure is also directed to providing a pouch-type secondary battery using the pouch exterior, and a method of manufacturing the pouch-type secondary battery.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

In one aspect of the present disclosure, there is provided a pouch exterior for a secondary battery, the pouch exterior including two corresponding accommodating parts configured to mount an electrode assembly therebetween and symmetrically formed at both sides by disposing a protruding part therebetween, and folded along two folding lines outside a center part of the protruding part by vertically mounting a side surface of the electrode assembly on the protruding part, such that folded parts surround side edges of the electrode assembly.

A length of the pouch exterior between the two folding lines may correspond to a thickness of the electrode assembly.

A depth of a bottom edge of each accommodating part away from the protruding part may be greater than a depth of a bottom edge of the accommodating part close to the protruding part such that a bottom surface of the accommodating part may be inclined.

A width of a top surface of the protruding part may be greater than zero and less than a thickness of the electrode assembly.

A depth of a bottom edge of each accommodating part away from the protruding part may be equal to or greater than ½ of a thickness of the electrode assembly. A depth of a bottom edge of the accommodating part close to the protruding part may be equal to or greater than ½ of a value obtained by subtracting a width of a top surface of the protruding part from the thickness of the electrode assembly.

Bottom edges of the two accommodating parts close to the protruding part may serve as the two folding lines.

The accommodating parts may not be connected to each other.

Outer sides of the accommodating parts opposite the protruding part may be extended relatively long.

In another aspect of the present disclosure, there is also provided a pouch-type secondary battery in which a single unit of a sheet-type pouch exterior including two corresponding accommodating parts configured to mount an electrode assembly therebetween and symmetrically formed at both sides by disposing a protruding part therebetween is folded along two folding lines outside a center part of the protruding part by vertically mounting a side surface of the electrode assembly on the protruding part, such that folded parts surround side edges of the electrode assembly, and the accommodating parts are overlapped and thermally fused together.

A length of the pouch exterior between the two folding lines may correspond to a thickness of the electrode assembly such that an excess portion may not be generated between the folded parts.

A depth of a bottom edge of each accommodating part away from the protruding part may be equal to or greater than ½ of the thickness of the electrode assembly, a depth of a bottom edge of the accommodating part close to the protruding part may be equal to or greater than ½ of a value obtained by subtracting a width of a top surface of the protruding part from the thickness of the electrode assembly, and the bottom edges of the two accommodating parts close to the protruding part may serve as the two folding lines.

In another aspect of the present disclosure, there is also provided a method of manufacturing a pouch-type secondary battery, the method including preparing a pouch exterior according to the present disclosure, overlapping accommodating parts by vertically mounting a side surface of an electrode assembly on a protruding part and folding the pouch exterior along two folding lines in such a manner that folded parts surround side edges of an electrode assembly, and thermally fusing surrounding sides of the overlapped accommodating parts.

Herein, outer sides of the accommodating parts opposite the protruding part may be extended relatively long, and the accommodating parts may be overlapped, sides of the accommodating parts other than the outer sides may be thermally fused, the outer sides of the accommodating parts may be thermally fused after injecting an electrolyte therethrough, and then the outer sides of the accommodating parts may be partially cut.

The present disclosure provides a pouch exterior formed to prevent an unnecessary space of a folded part in a three-side sealed pouch-type secondary battery.

The pouch exterior according to the present disclosure is not folded at a center part but is folded near bottom edges of accommodating parts, and thus does not need to give a margin of about 1.5 mm to 3 mm near the center part in consideration of folding like a conventional pouch exterior. Compared to the conventional case in which the pouch exterior should be folded near a center part of a side surface of an electrode assembly and thus an unnecessary space is generated due to a bent shape of the folded part, in the present disclosure, bent shapes of the folded parts are moved aside to side edges of an electrode assembly. Therefore, an area for the electrode assembly in the pouch exterior may be maximized without generating an unnecessary space in a cell and thus an energy density of the cell may be increased. By preventing the unnecessary space of the folded parts, a cell capacity may be increased and an energy density of a module/pack including the pouch-type secondary battery may also be increased. In addition, since the unnecessary space of the folded parts is prevented, a module/pack cooling structure and an assembly process may be simplified.

The pouch exterior according to the present disclosure may reduce a defect rate by preventing a rupture of the pouch exterior in a manufacturing process, may mount the electrode assembly at an accurate position without an additional device, and may increase a lifetime of the battery by minimizing sealing parts contacting the air and reducing possibilities of permeation of air, moisture, etc. and leakage of an electrolyte.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 4:
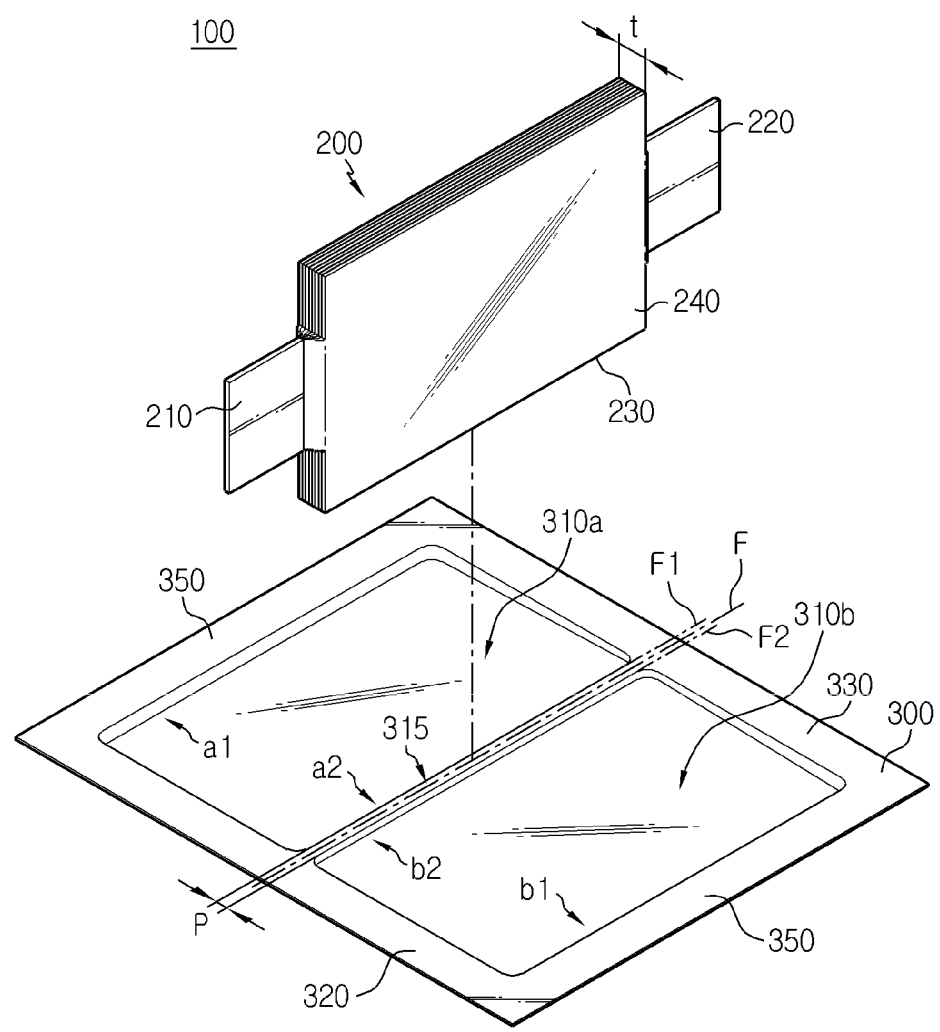
FIG. 4 is an exploded perspective view of a pouch-type secondary battery according to an embodiment of the present disclosure.
Figure 5:
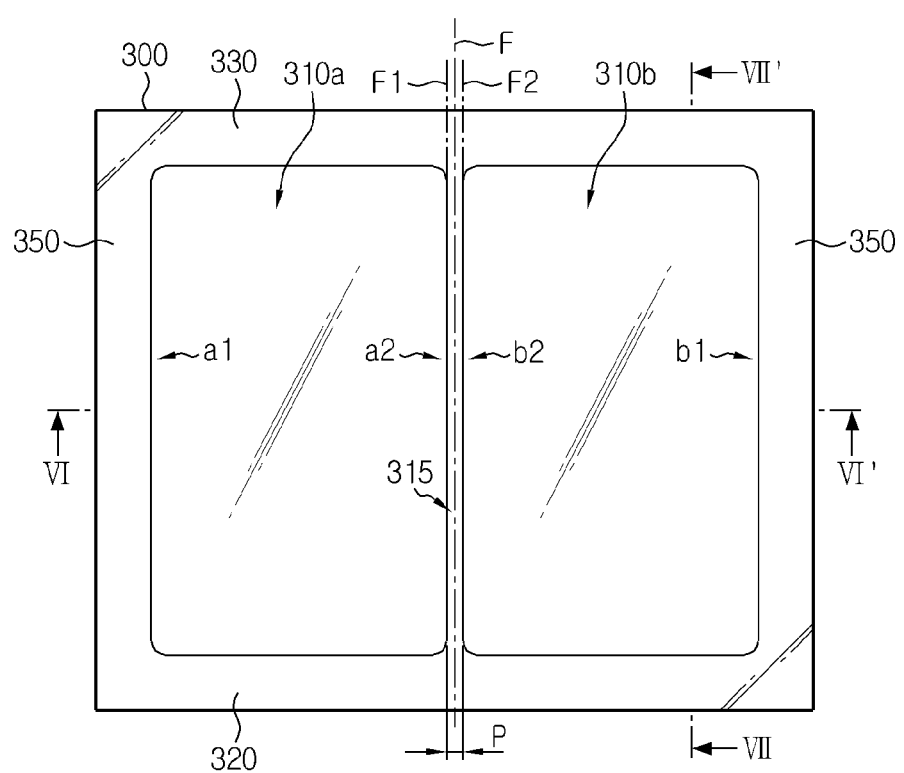
FIG. 5 is a top view of a pouch exterior included in FIG. 4.
Figure 6:
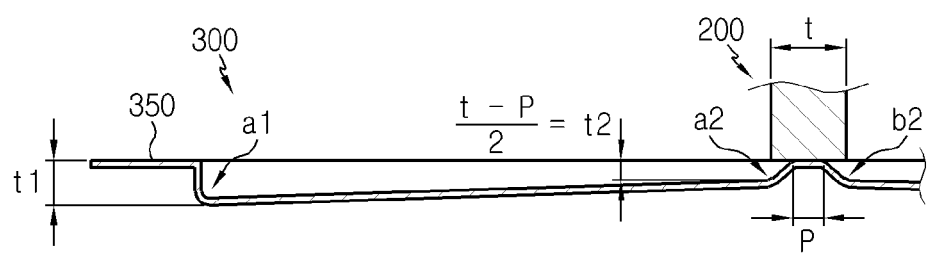
FIG. 6 is a part of a cross-sectional view taken along a line VI-VI' of FIG. 5.
Figure 7:
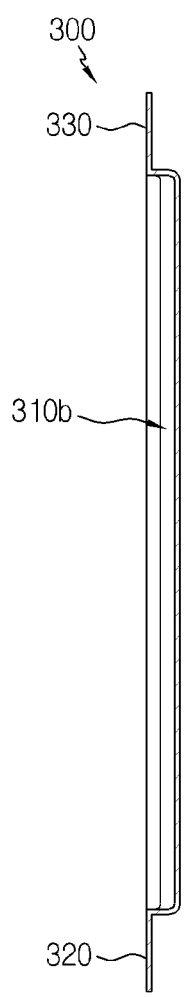
FIG. 7 is a cross-sectional view taken along a line VII-VII' of FIG. 5.

FIG. 4 is an exploded perspective view of a pouch-type secondary battery 100 according to an embodiment of the present disclosure. FIG. 5 is a top view of a pouch exterior 300 included in FIG. 4. FIG. 6 is a part of a cross-sectional view taken along a line VI-VI' of FIG. 5. FIG. 7 is a cross-sectional view taken along a line VII-VII' of FIG. 5.

Initially, referring to FIG. 4, the pouch-type secondary battery 100 includes an electrode assembly 200 and the pouch exterior 300.

The electrode assembly 200 may be a stacked electrode assembly in which a plurality of positive and negative plates cut to a predetermined size are stacked on one another by disposing a separator therebetween. A positive electrode 210 and a negative electrode 220 of the electrode assembly 200 protrude in opposite directions from both sides of the pouch exterior 300.

Two corresponding accommodating parts 310a and 310b are formed in the pouch exterior 300 according to the present disclosure. A protruding part 315 is generated between the accommodating parts 310a and 310b such that the accommodating parts 310a and 310b are not connected to each other. The accommodating part 310a at a side may have a width corresponding to a bottom surface (not shown) of the electrode assembly 200, and the accommodating part 310b at the other side may have a width corresponding to a top surface 240 of the electrode assembly 200.

A width P of a top surface of the protruding part 315 is greater than zero and less than a thickness t of the electrode assembly 200. Compared to a conventional case in which accommodating parts are spaced apart from each other by a distance greater than the thickness of an electrode assembly and are further spaced apart from each other in consideration of a margin of about 1.5 mm to 3 mm, the width P of the top surface of the protruding part 315 less than the thickness t of the electrode assembly 200 is smaller than that of the conventional case.

Since the width P of the top surface of the protruding part 315 should be less than the thickness t of the electrode assembly 200, when the pouch exterior 300 is compressed to generate the two adjacent accommodating parts 310a and 310b, a material, method, or mold design for forming the pouch exterior 300 may be changed to prevent a reduction in mechanical strength or a rupture of the protruding part 315 between the two accommodating parts 310a and 310b closer than the conventional case. However, since a forming depth is not increased compared to the conventional case, as to be shown in a test example described below, the pouch exterior 300 may be produced without being ruptured.

Herein, reference numerals 320, 330, and 350 denote upper sealing parts, lower sealing parts, and side sealing parts, respectively.

In a preferable example, the pouch exterior 300 may have a structure in which outer sides of the accommodating parts 310a and 310b opposite the protruding part 315, i.e., the side sealing parts 350, are extended relatively long. In this case, the pouch-type secondary battery 100 may be manufactured by overlapping the accommodating parts 310a and 310b to accommodate the electrode assembly 200 therebetween, sealing all sealing parts (contact parts) other than the extended side sealing parts 350, i.e., the upper sealing parts 320 and the lower sealing parts 330, sealing the side sealing parts 350 after injecting an electrolyte therethrough, and cutting the side sealing parts 350 to a predetermined size. Based on the above-described structure of the pouch exterior 300, the electrolyte may be easily injected and may be prevented from overflowing due to a user mistake.

The pouch exterior 300 may be configured as a laminate sheet including a metal layer and a resin layer. Particularly, the laminate sheet may be an aluminum laminate sheet. The pouch exterior 300 includes a core layer configured as a metal layer, a thermosetting layer generated on a top surface of the core layer, and an insulating layer generated on a bottom surface of the core layer. The thermosetting layer may be made of polymer resin, e.g., modified polypropylene such as casted polypropylene (CPP), to serve as an adhesive layer, and the insulating layer may be made of nylon or resin such as polyethylene terephthalate (PET). However, the structure and material of the pouch exterior 300 are not limited thereto.

The accommodating parts 310a and 310b of the pouch exterior 300 may be simultaneously formed in a single process by compressing the aluminum laminate sheet using a die and a punch based on a deep drawing method.

Further referring to FIGS. 5 to 7, a depth t1 of a bottom edge a1 of the accommodating part 310a away from the protruding part 315 is equal to or greater than ½ of the thickness t of the electrode assembly 200 and, likewise, a depth t1 of a bottom edge b1 of the accommodating part 310b away from the protruding part 315 is equal to or greater than ½ of the thickness t of the electrode assembly 200. The depth t1 of the bottom edge a1 and the depth t1 of the bottom edge b1, which are equal to ½ of the thickness t of the electrode assembly 200, may not waste a space and thus may be ideal. However, some products may require slightly larger depths for an extra space to achieve convenience in processing. Therefore, the depth t1 of the bottom edge a1 and the depth t1 of the bottom edge b1 may be equal to or greater than ½ of the thickness t of the electrode assembly 200.

A depth t2 of a bottom edge a2 of the accommodating part 310a close to the protruding part 315 and a depth t2 of a bottom edge b2 of the accommodating part 310b close to the protruding part 315, which correspond to a height of the protruding part 315, is ½ of a value obtained by subtracting the width P of the top surface of the protruding part 315 from the thickness t of the electrode assembly 200.

The bottom edge a2 of the accommodating part 310a close to the protruding part 315 and the bottom edge b2 of the accommodating part 310b close to the protruding part 315 serve as folding lines F1 and F2 later. The accommodating part 310a at a side and the accommodating part 310b at the other side are mirror-symmetric with respect to a center part F.

As particularly shown in FIG. 6, each of the accommodating parts 310a and 310b has an inclined bottom surface. The depth t1 of the bottom edge a1 of the accommodating part 310a away from the protruding part 315 is greater than the depth t2 of the bottom edge a2 of the accommodating part 310a close to the protruding part 315. Likewise, the depth t1 of the bottom edge b1 of the accommodating part 310b away from the protruding part 315 is greater than the depth t2 of the bottom edge b2 of the accommodating part 310b close to the protruding part 315. If the width P of the top surface of the protruding part 315 is increased, a difference between the depth t1 and the depth t2 is also increased. Otherwise, if the width P of the top surface of the protruding part 315 is reduced, the difference between the depth t1 and the depth t2 is also reduced. The width P of the top surface of the protruding part 315 may be determined in consideration of a material, an elongation rate, etc. of the pouch exterior 300.

In the conventional case, the accommodating parts have a constant depth corresponding to about a half of the thickness of the electrode assembly and bottom surfaces of the accommodating parts are not inclined. On the contrary, the accommodating parts 310a and 310b of the present disclosure have a maximum depth of the depth t1 equal to or greater than ½ of the thickness t of the electrode assembly 200 and have a minimum depth of the depth t2 corresponding to ½ of the value obtained by subtracting the width P of the top surface of the protruding part 315 from the thickness t of the electrode assembly 200. In addition, the bottom surfaces thereof are gradually inclined from an edge having the maximum depth to another edge having the minimum depth.

As described above, the pouch exterior 300 of the present disclosure differs from the conventional pouch exterior in the depth, the shape of bottom surfaces of two accommodating parts, and the width of a protruding part between the accommodating parts. The depth of the pouch exterior 300 of the present disclosure is smaller. The bottom surfaces of the accommodating parts 310a and 310b of the pouch exterior 300 of the present disclosure are inclined. The width of the protruding part 315 of the pouch exterior 300 of the present disclosure is smaller.

Figure 8:
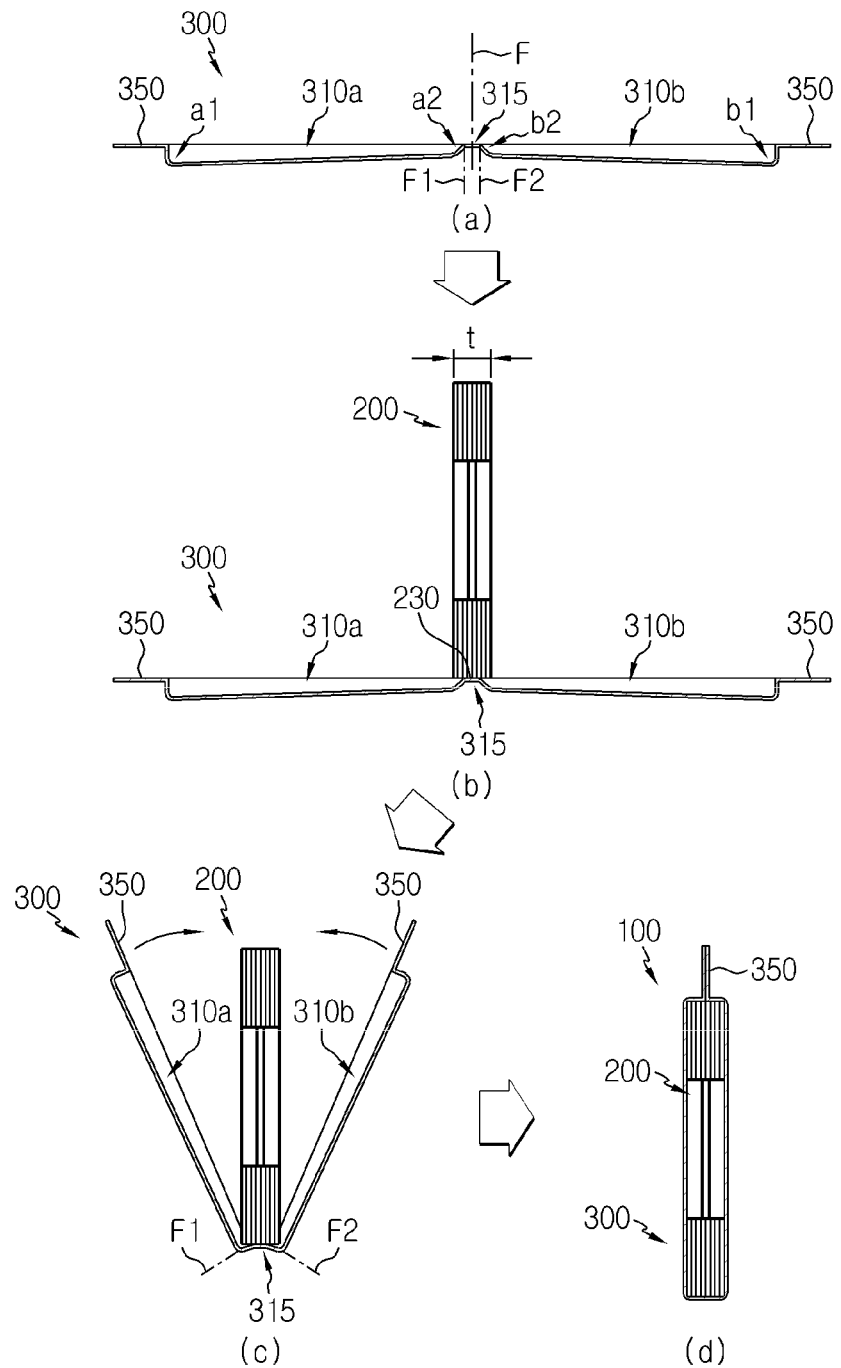
FIG. 8 illustrates sequential cross-sectional views for describing a method of manufacturing the pouch-type secondary battery using the pouch exterior of FIG. 5, taken along the line VI-VI' of FIG. 5.
Figure 9:
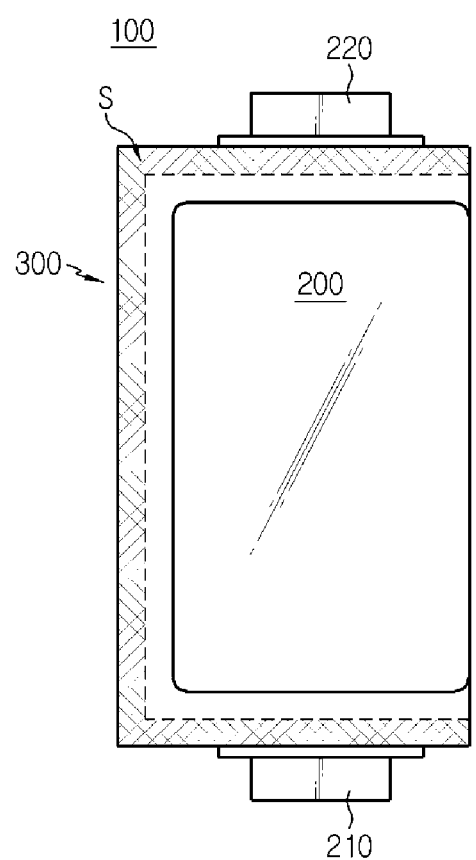
FIG. 9 is a top view of the pouch-type secondary battery manufactured using the method of FIG. 8.

FIG. 8 illustrates sequential cross-sectional views for describing a method of manufacturing the pouch-type secondary battery 100 using the pouch exterior 300 of FIG. 5, taken along the line VI-VI' of FIG. 5. FIG. 9 is a top view of the pouch-type secondary battery 100 manufactured using the method of FIG. 8.

FIG. 8(a) is a cross-sectional view showing that the pouch exterior 300 is formed in a spread state. Then, a side surface 230 of the electrode assembly 200 having the thickness t is vertically mounted on the protruding part 315 at the center of the pouch exterior 300 as shown in FIG. 8(b), and the pouch exterior 300 is folded and the two accommodating parts 310a and 310b are overlapped to cover both sides of the electrode assembly 200 in the order of FIG. 8(c) and FIG. 8(d).

Referring to FIG. 4 together, the side surface 230 of the electrode assembly 200 is mounted on the protruding part 315 in such a manner that the positive electrode 210 and the negative electrode 220 are located to correspond to the upper sealing parts 320 and the lower sealing parts 330, and the pouch exterior 300 is folded in such a manner that the upper sealing parts 320, the lower sealing parts 330, and the side sealing parts 350 individually contact each other.

In this case, instead of folding the center part F between the accommodating parts 310a and 310b as in the conventional case, the pouch exterior 300 is folded along the two folding lines F1 and F2 outside the center part F of the protruding part 315, i.e., the folding line F1 based on the bottom edge a2 of the accommodating part 310a close to the protruding part 315 and the folding line F2 based on the bottom edge b2 of the accommodating part 310b close to the protruding part 315. A length of the pouch exterior 300 between the two folding lines F1 and F2 nearly corresponds to the thickness t of the electrode assembly 200, and thus the side surface 230 of the electrode assembly 200 may be covered without unnecessarily wasting a space. The pouch exterior 300 may be easily folded along the pre-formed bottom edges a2 and b2, may not be wrinkled, and may be firmly sealed in a subsequent process. As described above, differently from the conventional case in which a pouch exterior is folded along a single folding line corresponding to a center part between the two accommodating parts and thus the folded part serves as an excess portion along a center part of a side surface of the electrode assembly, in the present disclosure, since the pouch exterior 300 is folded along the two folding lines outside the center part and the folded parts are moved aside to surround side edges of the electrode assembly 200, no excess portion is generated at the side surface of the electrode assembly 200.

Referring to FIG. 9, it is shown that no excess portion is generated at a non-sealed right side surface of the pouch-type secondary battery 100 unlike the conventional case. As described above, if the length of the pouch exterior 300 between the two folding lines F1 and F2 corresponds to the thickness t of the electrode assembly 200, no excess portion is generated between the folded parts.

Figure 10:
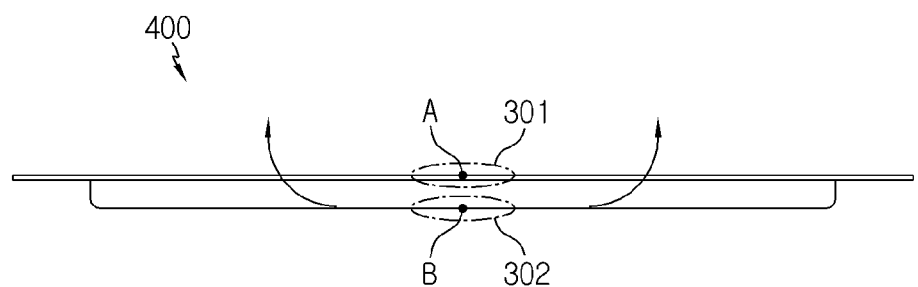
FIG. 10 is a front view of a pouch exterior including accommodating parts connected to each other, according to a comparative example.

If the protruding part 315 is not generated and the accommodating parts 310a and 310b are fully connected to each other, since a part of an outer circumferential surface of the pouch exterior 300 is deformed when the pouch exterior 300 is folded, a structurally stable battery may not be manufactured as shown in FIG. 10 illustrating a pouch exterior having no protruding part according to a comparative example.

FIG. 10 is a front view of a pouch exterior 400 including accommodating parts connected to each other, according to a comparative example.

Referring to FIG. 10, when the pouch exterior 400 is folded with respect to a point A, a lower part 302 of the pouch exterior 400 receives a large tensile force in arrow directions. Since the pouch exterior 400 is configured as a very thin laminate sheet as described above, such tensile force may break the lower part 302 of the pouch exterior 400.

Accordingly, in the pouch exterior 400 illustrated in FIG. 10, the pouch exterior 400 should be folded with respect to a point B located on a bottom surface thereof. However, if the pouch exterior 400 is folded as described above, deformation occurs near the point B and thus an upper part 301 of the pouch exterior 400 is bent toward the point B and is deformed. Therefore, a normal battery capable of maintaining sealability may not be manufactured.

However, in the present disclosure, since the bottom edges a2 and b2 having a predetermined depth should be generated to provide the protruding part 315 and the pouch exterior 300 is folded along the folding lines F1 and F2 based on the bottom edges a2 and b2, excessive deformation does not occur near the folded parts.

As described above, the present disclosure may provide a pouch-type secondary battery for folding a pouch exterior along two folding lines by changing a formed shape of the pouch exterior in such a manner that the folded parts surround side edges of an electrode assembly, the battery being capable of stably sealing the electrode assembly without unnecessarily wasting a space near the folded parts, and of maximizing an area for the electrode assembly in the pouch exterior, and being usable as a high-capacity and high-density electric vehicle battery and a high-capacity secondary battery, and a method of manufacturing the same.

After the process of FIG. 8(d) in which the pouch exterior 300 is folded and overlapped in such a manner that the upper sealing parts 320, the lower sealing parts 330, and the side sealing parts 350 of FIG. 4 individually contact each other, the upper sealing parts 320 and the lower sealing parts 330 may be thermally fused, the side sealing parts 350 may be thermally fused after injecting an electrolyte through a gap therebetween, and then the side sealing parts 350 may be cut to a predetermined length.

Although the positive electrode 210 and the negative electrode 220 of the electrode assembly 200 protrude in opposite directions in the above-described pouch-type secondary battery 100, an electrode assembly including a positive electrode and a negative electrode protruding in the same direction may also be manufactured to a pouch-type secondary battery using the pouch exterior 300 according to the present disclosure.

Figure 11:
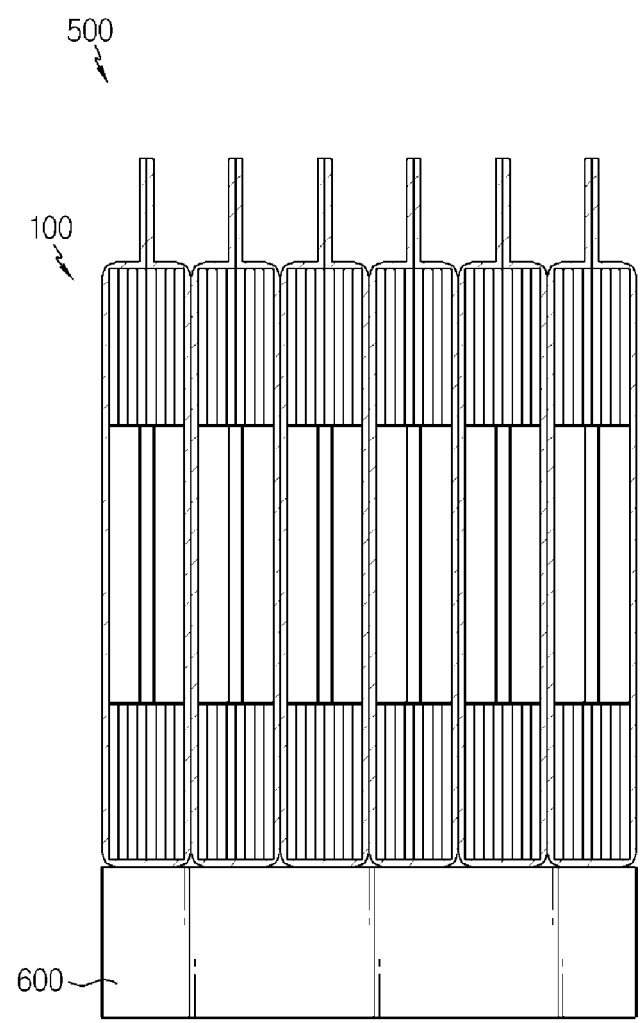
FIG. 11 is a cross-sectional view of a battery module including the pouch-type secondary batteries according to the present disclosure.

A plurality of the pouch-type secondary batteries 100 of FIG. 9 according to the present disclosure may be stacked on one another to manufacture a battery module/pack. FIG. 11 is a cross-sectional view of a battery module 500 including the pouch-type secondary batteries 100 according to the present disclosure.

Referring to FIG. 11, in the battery module 500, a plurality of the pouch-type secondary batteries 100 may be stacked on one another and non-sealed surfaces thereof may be located at a lower side and attached to a top surface of a cooling plate 600. For example, surfaces of the pouch-type secondary batteries 100 corresponding to the right side surface in the configuration of FIG. 9 may be located at the lower side and may be attached to the top surface of the cooling plate 600. Compared to sealed surfaces, since the non-sealed surfaces do not have unnecessarily protruding parts, the pouch-type secondary batteries 100 may fully and closely contact the cooling plate 600 and the structure of the top surface of the cooling plate 600 may be simplified.

Figure 1:
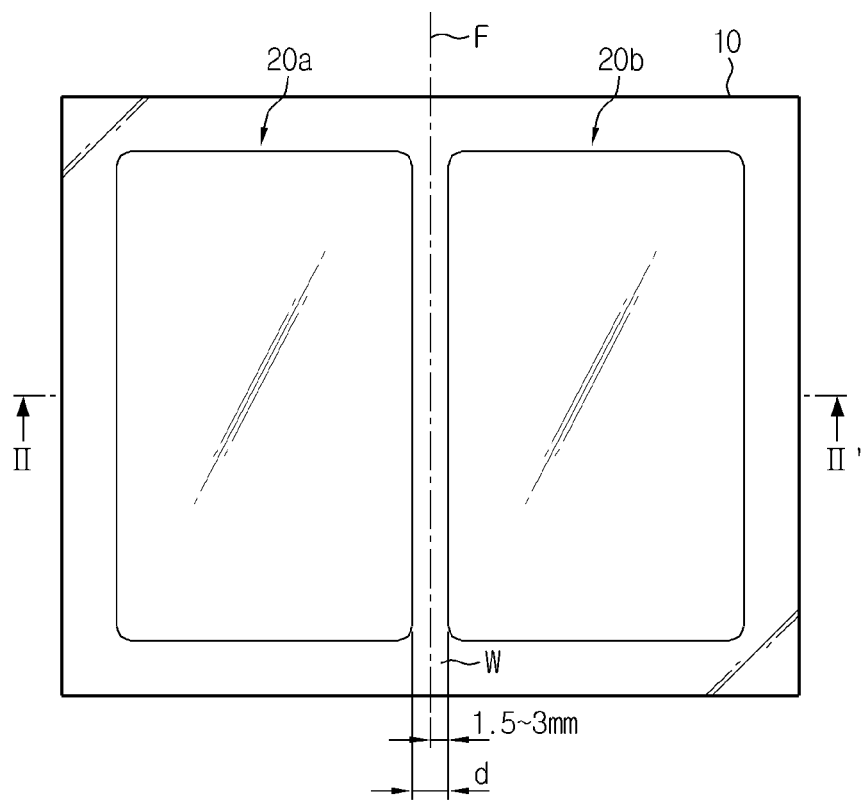
FIG. 1 is a top view of a pouch exterior of a conventional three-side sealed pouch-type secondary battery.
Figure 2:
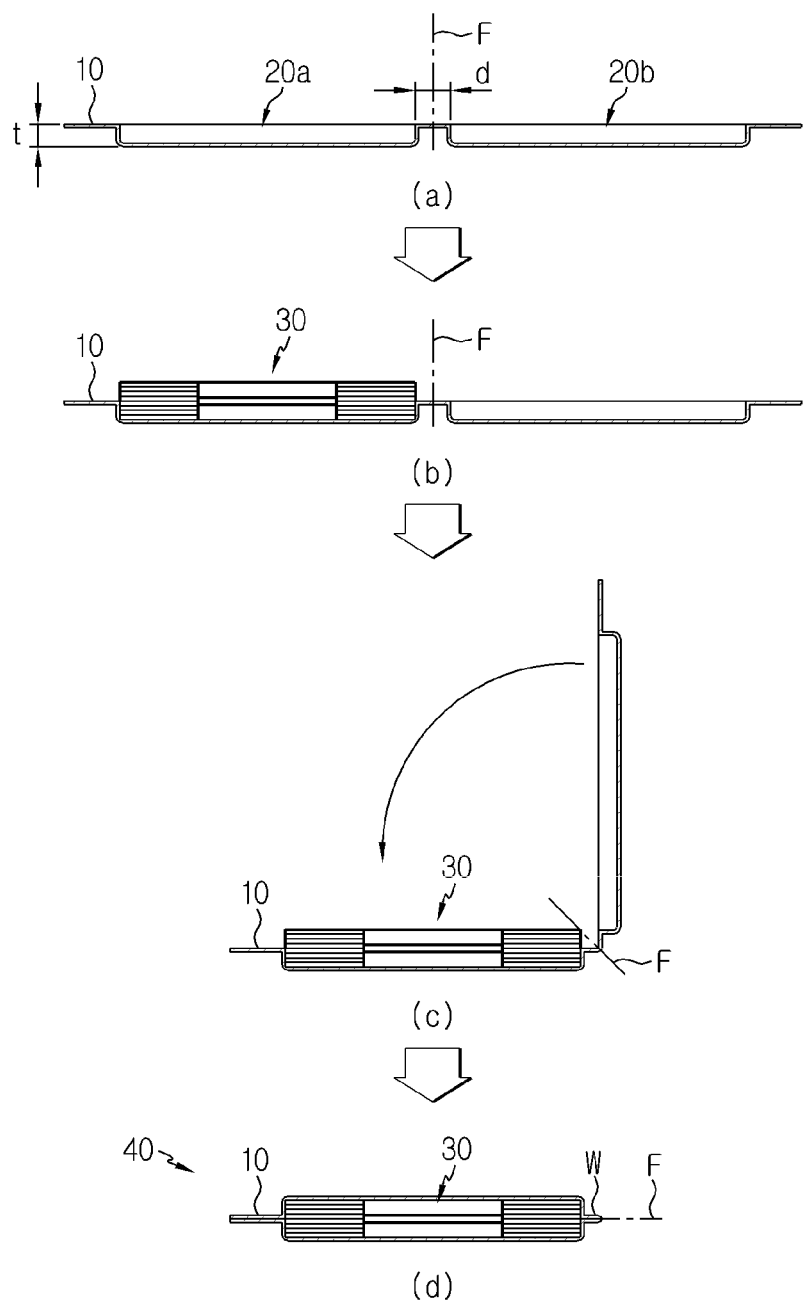
FIG. 2 illustrates sequential cross-sectional views for describing a method of manufacturing a pouch-type secondary battery using the pouch exterior of FIG. 1, taken along a line II-II' of FIG. 1.
Figure 3:
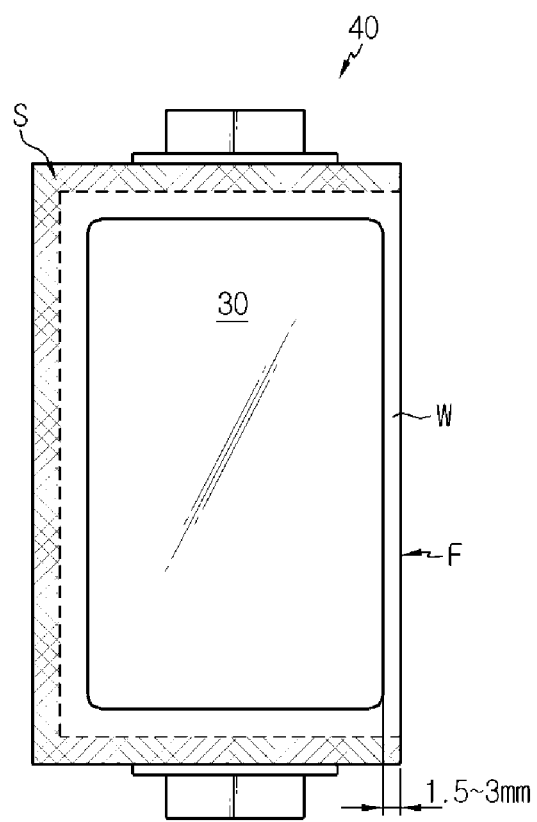
FIG. 3 is a top view of the pouch-type secondary battery manufactured using the method of FIG. 2.
Figure 12:
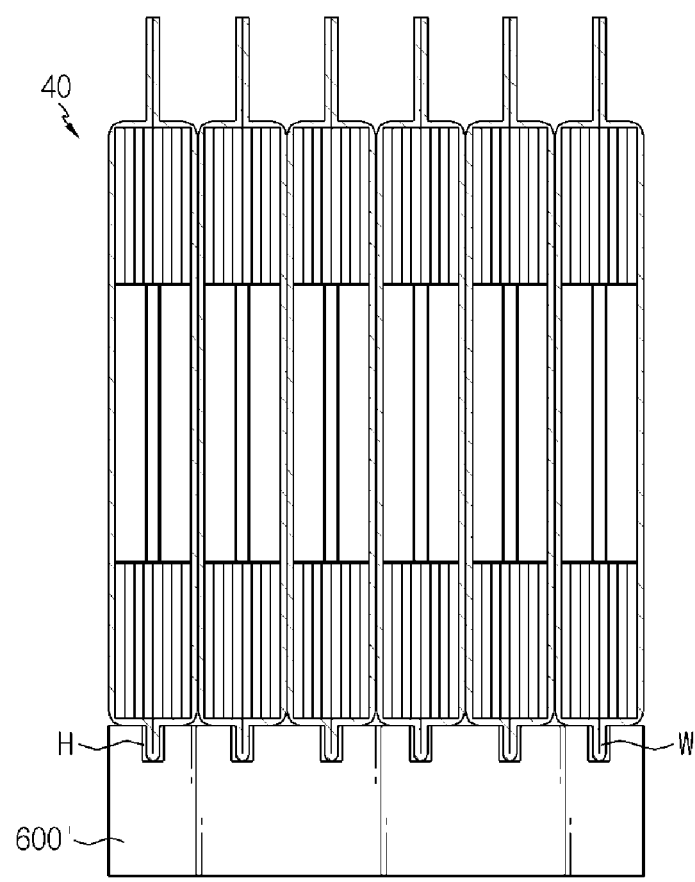
FIG. 12 is a cross-sectional view of a battery module including the conventional pouch-type secondary batteries each having, for example, a folded part of FIG. 3, according to a comparative example of FIG. 11.

FIG. 12 is a cross-sectional view of a battery module including the conventional pouch-type secondary batteries 40 each having, for example, the folded part w of FIG. 3, according to a comparative example of FIG. 11.

Since the pouch-type secondary batteries 40 have the folded parts w, a cooling plate 600' should be generated in a complicated shape having at least slits H into which the folded parts w are inserted. If a cooling plate having wider grooves is generated to accommodate the folded parts w therein, a contact area between the pouch-type secondary batteries 40 and the cooling plate may be reduced and sufficient cooling performance may not be easily expected.

As comparatively shown in FIGS. 11 and 12, according to the configuration of the present disclosure, the pouch-type secondary batteries 100 and the cooling plate 600 may be located closer to each other compared to the conventional case. That is, since the non-sealed surfaces do not have unnecessarily protruding parts, the cooling plate 600 and the pouch-type secondary batteries 100 may fully and closely contact each other. Therefore, a total volume of the battery module 500 may be reduced and thus an energy density may be increased. Furthermore, according to the above-described configuration of the present disclosure, the maximum contact area between the pouch-type secondary batteries 100 and the cooling plate 600 may be ensured and thus heat transfer efficiency may be increased. Accordingly, heat generated from the electrode assemblies in the pouch-type secondary batteries 100 may be rapidly and appropriately transferred to the cooling plate 600 and thus cooling efficiency may be increased. In addition, although the folded parts w should be individually inserted into the slits H to assemble the battery module of FIG. 12, in the present disclosure, such process may not be necessary and thus the assembly process may be simplified.

Figure 13:
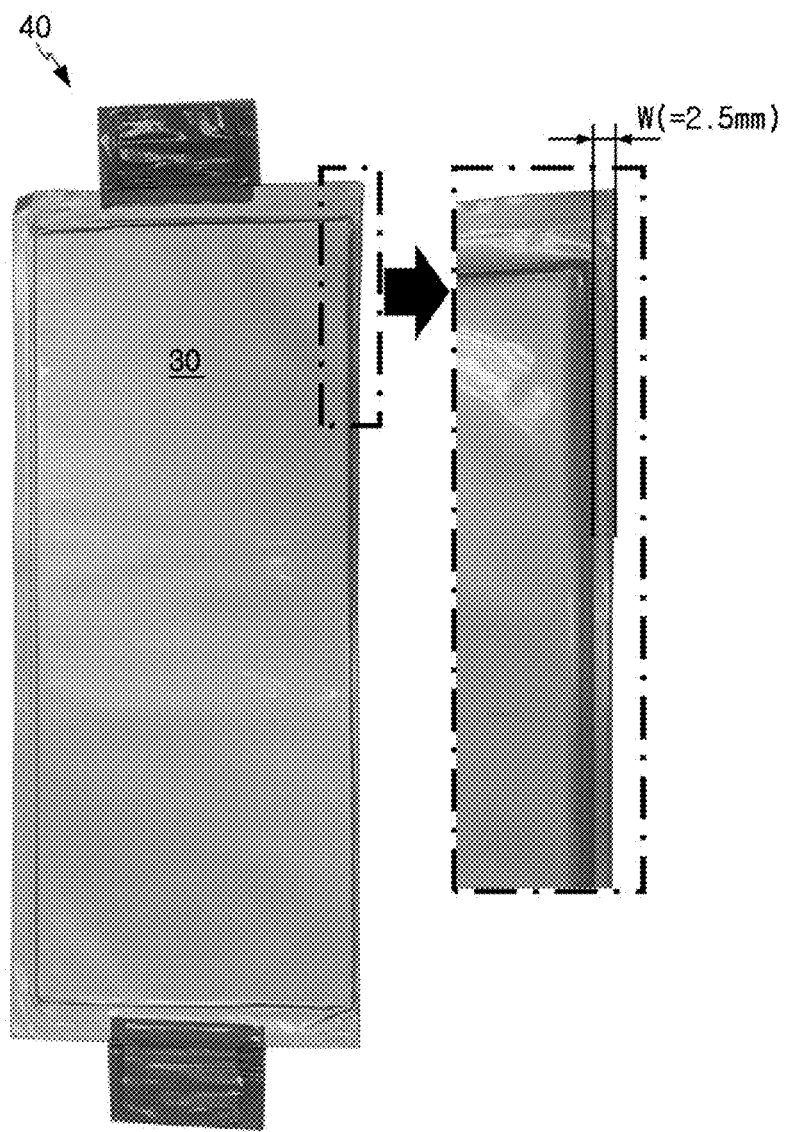
FIG. 13 is a photographic image of the conventional three-side sealed pouch-type secondary battery.

FIG. 13 is a photographic image of the conventional three-side sealed pouch-type secondary battery 40.

Referring to FIG. 13, the conventional three-side sealed pouch-type secondary battery 40 obtains the folded part w when the three sides are sealed. The folded part w has a length of about 2.5 mm and protrudes from a side surface of the electrode assembly 30.

Figure 14:
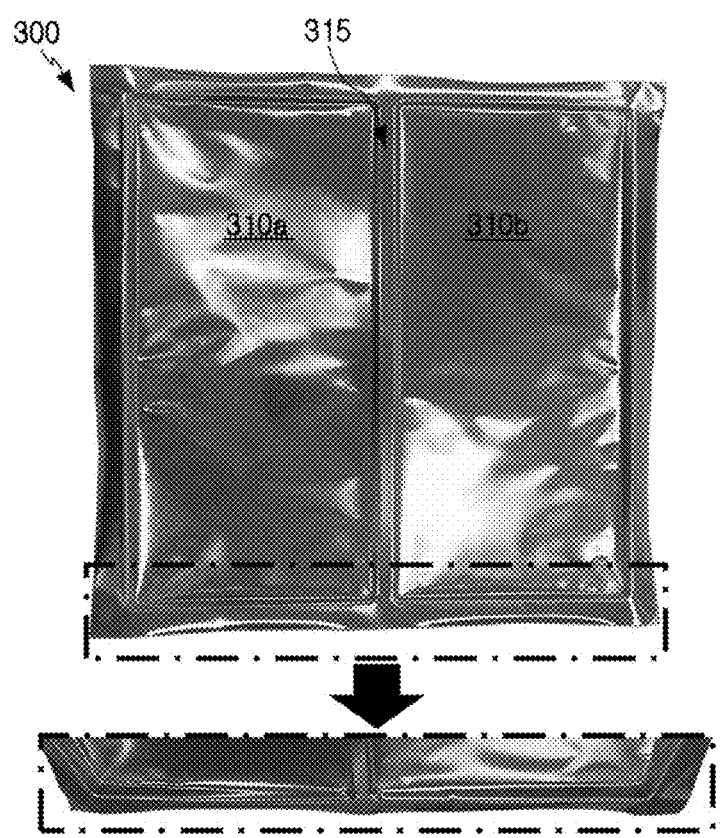
FIGS. 14 and 15 are photographic images of the pouch exterior according to the present disclosure.
Figure 15:
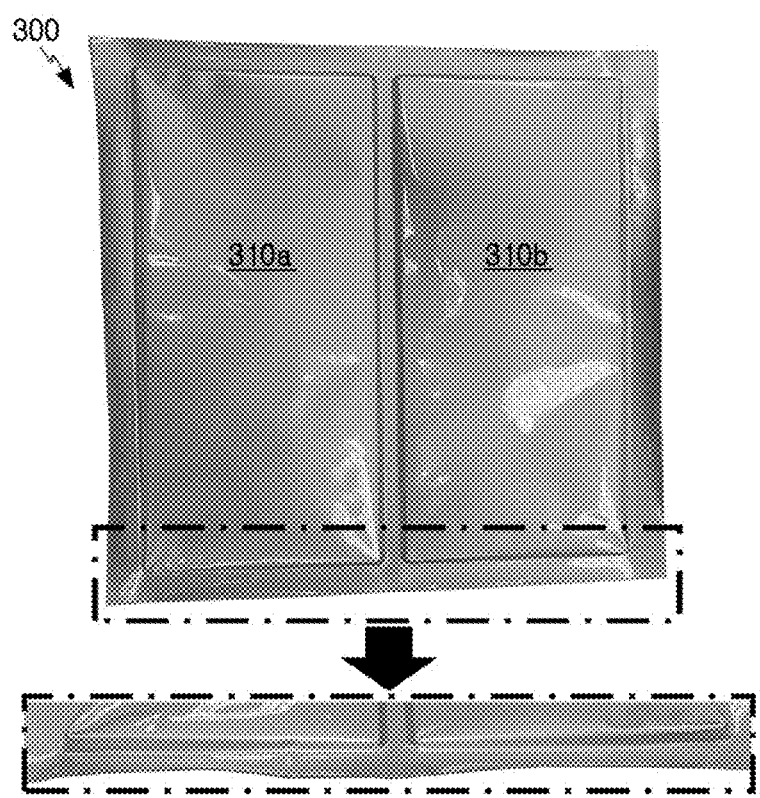

FIGS. 14 and 15 are photographic images of the pouch exterior 300 according to the present disclosure. FIG. 14 is a top view showing an inner surface of the pouch exterior 300, and FIG. 15 is a bottom view showing an outer surface of the pouch exterior 300.

As shown in FIGS. 14 and 15, the pouch exterior 300 according to the present disclosure may be formed without being ruptured or torn. It is also shown that the accommodating parts 310a and 310b and the protruding part 315 may be formed as desired without any distortion or concentration of stress.

Figure 16:
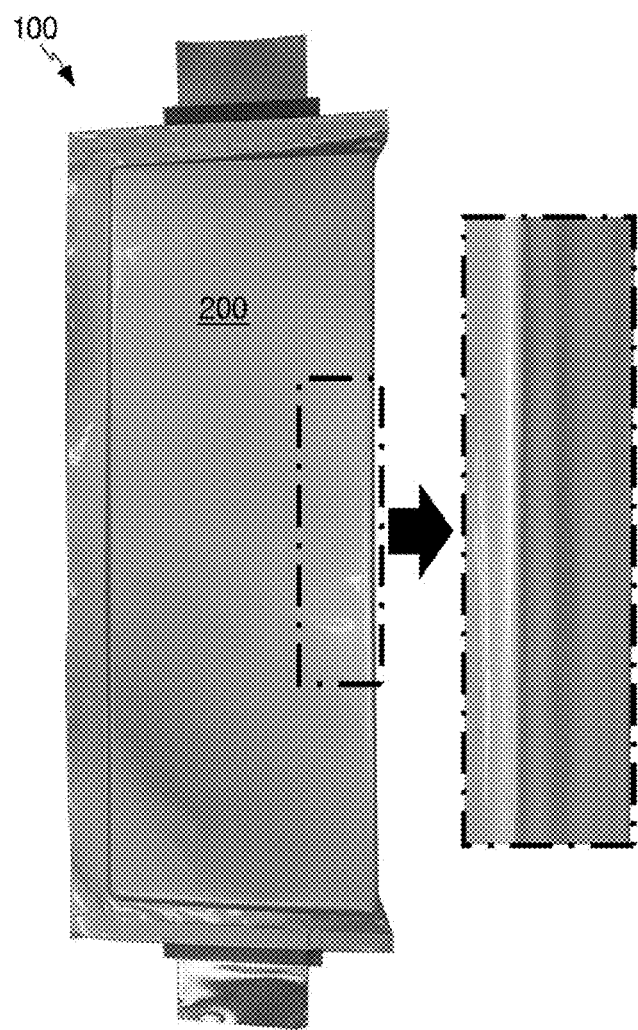
FIG. 16 is a photographic image of the pouch-type secondary battery according to the present disclosure.

FIG. 16 is a photographic image of the pouch-type secondary battery 100 manufactured using the pouch exterior 300, according to the present disclosure.

As comparatively shown in FIGS. 16 and 13, the pouch-type secondary battery 100 according to the present disclosure does not have an unnecessarily protruding part on a non-sealed surface. A flat shape of a side surface of an electrode assembly is maintained on a side surface of the pouch-type secondary battery 100. As described above, compared to the conventional case in which the pouch exterior 10 should be folded near a center part of the side surface of the electrode assembly 30 and thus an unnecessary space such as the folded part w of FIG. 13 is generated due to a bent shape of the folded part, in the present disclosure, since bent shapes of the folded parts of the pouch exterior 300 may be moved aside to side edges of the electrode assembly 200, the unnecessary space may be prevented from the non-sealed surface and thus a cell capacity may be increased. Furthermore, an energy density of a module/pack including the pouch-type secondary battery 100 may be increased. In addition, since the unnecessary space is prevented, a module/pack cooling structure and an assembly process may be simplified.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A pouch exterior comprising:
   two corresponding accommodating parts configured to mount an electrode assembly therebetween and symmetrically formed at both sides by disposing a protruding part therebetween, and folded along two folding lines outside a center part of the protruding part by vertically mounting a side surface of the electrode assembly on the protruding part, such that folded parts surround side edges of the electrode assembly,
   wherein the electrode assembly includes a positive electrode and a negative electrode that protrude from opposite sides of the pouch exterior.

2. The pouch exterior of claim 1, wherein a length of the pouch exterior between the two folding lines corresponds to a thickness of the electrode assembly.

3. The pouch exterior of claim 1, wherein a depth of a bottom edge of each accommodating part away from the protruding part is greater than a depth of a bottom edge of the accommodating part close to the protruding part such that a bottom surface of the accommodating part is inclined.

4. The pouch exterior of claim 1, wherein a width of a top surface of the protruding part is greater than zero and less than a thickness of the electrode assembly.

5. The pouch exterior of claim 1, wherein a depth of a bottom edge of each accommodating part away from the protruding part is equal to or greater than ½ of a thickness of the electrode assembly.

6. The pouch exterior of claim 5, wherein a depth of a bottom edge of the accommodating part close to the protruding part is equal to or greater than ½ of a value obtained by subtracting a width of a top surface of the protruding part from the thickness of the electrode assembly.

7. The pouch exterior of claim 5, wherein bottom edges of the two accommodating parts close to the protruding part serve as the two folding lines.

8. A pouch-type secondary battery in which comprising:
   a single unit of a sheet-type pouch exterior comprising two corresponding accommodating parts configured to mount an electrode assembly therebetween and symmetrically formed at both sides by disposing a protruding part therebetween,
   wherein the single unit of the sheet-type pouch exterior is folded along two folding lines outside a center part of the protruding part by vertically mounting a side surface of the electrode assembly on the protruding part, such that folded parts surround side edges of the electrode assembly, and the accommodating parts are overlapped and thermally fused together,
   wherein the electrode assembly includes a positive electrode and a negative electrode that protrude from opposite sides of the pouch exterior.

9. The pouch-type secondary battery of claim 8, wherein a length of the pouch exterior between the two folding lines corresponds to a thickness of the electrode assembly such that an excess portion is not generated between the folded parts.

10. The pouch-type secondary battery of claim 8, wherein a depth of a bottom edge of each accommodating part away from the protruding part is equal to or greater than ½ of the thickness of the electrode assembly, wherein a depth of a bottom edge of the accommodating part close to the protruding part is equal to or greater than ½ of a value obtained by subtracting a width of a top surface of the protruding part from the thickness of the electrode assembly, and wherein the bottom edges of the two accommodating parts close to the protruding part serve as the two folding lines.

11. A method of manufacturing a pouch-type secondary battery, the method comprising:
   preparing a pouch exterior comprising two corresponding accommodating parts configured to mount an electrode assembly therebetween and symmetrically formed at both sides by disposing a protruding part therebetween, and folded along two folding lines outside a center part of the protruding part by vertically mounting a side surface of the electrode assembly on the protruding part, such that folded parts surround side edges of the electrode assembly;
   overlapping the accommodating parts by vertically mounting the side surface of the electrode assembly on the protruding part and folding the pouch exterior along the two folding lines in such a manner that the folded parts surround the side edges of the electrode assembly;

and thermally fusing surrounding sides of the overlapped accommodating parts, wherein the electrode assembly includes a positive electrode and a negative electrode that protrude from opposite sides of the pouch exterior.

12. The method of claim 11, wherein outer sides of the accommodating parts opposite the protruding part are extended relatively long, and wherein the accommodating parts are overlapped, sides of the accommodating parts other than the outer sides are thermally fused, the outer sides of the accommodating parts are thermally fused after injecting an electrolyte therethrough, and then the outer sides of the accommodating parts are partially cut.

13. The method of claim 11, wherein a length of the pouch exterior between the two folding lines corresponds to a thickness of the electrode assembly such that an excess portion is not generated between the folded parts.

14. The method of claim 11, wherein a depth of a bottom edge of each accommodating part away from the protruding part is equal to or greater than ½ of a thickness of the electrode assembly, wherein a depth of a bottom edge of the accommodating part close to the protruding part is ½ of a value obtained by subtracting a width of a top surface of the protruding part from the thickness of the electrode assembly, and wherein the bottom edges of the two accommodating parts close to the protruding part serve as the two folding lines.

* * * * *